United States Patent [19]

Bice et al.

[11] Patent Number: 5,071,318
[45] Date of Patent: Dec. 10, 1991

[54] REACTOR COOLANT PUMP HAVING IMPROVED DYNAMIC SECONDARY SEAL ASSEMBLY

[75] Inventors: Charles D. Bice, Clinton Twp., Butler County; Clifford H. Campen, Plum Boro, both of Pa.

[73] Assignee: Westinghouse Electric Corp., Pittsburgh, Pa.

[21] Appl. No.: 468,316

[22] Filed: Jan. 22, 1990

[51] Int. Cl.$^5$ ............................................. F01D 25/00
[52] U.S. Cl. ........................ 415/230; 415/170.1; 277/27; 277/188 R; 277/188 A; 277/194
[58] Field of Search ............... 277/27, 85, 119, 188 R, 277/188 A, 193, 194, 195; 415/229, 230, 170.1, 174.2

[56] References Cited

U.S. PATENT DOCUMENTS

| | | | |
|---|---|---|---|
| 1,699,135 | 1/1929 | Cronin | 277/194 |
| 2,705,177 | 3/1955 | Waring | 309/23 |
| 2,825,590 | 3/1958 | Sutherland | 277/188 R |
| 2,898,134 | 8/1959 | Moskow | 277/188 R |
| 2,907,590 | 10/1959 | Oswald | 277/188 R |
| 2,935,365 | 5/1960 | Dega | 309/23 |
| 3,011,803 | 12/1961 | Buckner et al. | 277/188 R |
| 3,023,014 | 2/1962 | Donner | 277/78 |
| 3,388,915 | 6/1968 | Dega . | |
| 3,514,115 | 5/1970 | Gallo | 277/34.3 |
| 3,717,352 | 2/1973 | Jansing et al. | 277/34.3 |
| 3,727,925 | 4/1973 | Jones | 277/165 |
| 3,806,136 | 4/1974 | Warner et al. . | |
| 3,905,608 | 9/1975 | Olsen et al. | 277/188 R |
| 3,929,253 | 12/1975 | Johnsson | 220/320 |
| 4,192,558 | 3/1980 | Wade | 308/6 R |
| 4,236,971 | 12/1980 | Winkleblack | 176/87 |
| 4,306,727 | 12/1981 | Deane et al. | 277/81 R |
| 4,330,370 | 5/1982 | Kazan et al. | 376/200 |
| 4,373,599 | 2/1983 | Walter et al. | 277/188 R |
| 4,401,619 | 8/1983 | McEdwards | 376/206 |
| 4,418,924 | 12/1983 | Mack | 277/177 |
| 4,496,161 | 1/1985 | Fischer | 277/1 |
| 4,577,870 | 3/1986 | Scott et al. | 277/1 |
| 4,584,163 | 4/1986 | Hankinson | 376/205 |
| 4,693,481 | 9/1987 | Quinn | 277/96.2 |
| 4,716,005 | 12/1987 | Ezekoye et al. | 376/205 |

FOREIGN PATENT DOCUMENTS

| | | | |
|---|---|---|---|
| 3234696 | 3/1984 | Fed. Rep. of Germany | 277/27 |
| 1158808 | 5/1985 | U.S.S.R. | 277/188 A |
| 2083873 | 3/1982 | United Kingdom | 277/27 |

*Primary Examiner*—Edward K. Look
*Assistant Examiner*—Christopher M. Verdier

[57] ABSTRACT

A pump has a pair of seal parts which are arranged to undergo axial translatory motion and a seal assembly associated with the seal parts. The seal assembly includes an annular liner disposed within a groove in one seal part and projecting therefrom toward a cylindrical surface of the other seal part, and a flexibly resilient annular O-ring disposed within the groove between the cylindrical surface of the other seal part and a surface of the liner which extends generally parallel to the cylindrical surface of the other seal part. The O-ring is seatable on a radial surface of the annular liner and projects from the groove farther across a gap between the seal parts than the liner and into contact with the cylindrical surface of the other seal part such that the O-ring is capable of rolling on the cylindrical surface of the other seal part and slipping on the radial surface of the annular liner upon translatory movement of the seal parts relative to one another.

12 Claims, 4 Drawing Sheets

REACTOR COOLANT PUMP HAVING IMPROVED DYNAMIC SECONDARY SEAL ASSEMBLY

CROSS REFERENCE TO RELATED APPLICATIONS

Reference is hereby made to the following applications dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982, now U.S. Pat. No. 4,587,076 which issued May 6, 1986.

2. "Nuclear Reactor Coolant Pump Impeller/Shaft Assembly" by L. S. Jenkins, assigned U.S. Ser. No. 761,447 and filed Aug. 1, 1985, now U.S. Pat. No. 4,690,612 which issued Sept. 1, 1987.

3. "Improved Shaft Seal" by K. P. Quinn, assigned U.S. Ser. No. 739,745 and filed May 31, 1985, now U.S. Pat. No. 4,693,481 which issued Sept. 15, 1987.

4. "Reactor Coolant Pump Hydrostatic Sealing Assembly With Improved Hydraulic Balance" by R. F. Guardiani et al, assigned U.S. Ser. No. 063,331 and filed June 17, 1987, now U.S. Pat. No. 4,838,559 which issued June 13, 1989.

5. "Reactor Coolant Pump Sealing Surface With Titanium Nitride Coating" by G. Zottola et al, assigned U.S. Ser. No. 035,832 and filed Apr. 8, 1987, now U.S. Pat. No. 4,871,297 which issued Oct. 3, 1989.

6. "Reactor Coolant Pump Hydrostatic Sealing Assembly With Externally Pressurized Hydraulic Balance Chamber" by C. P. Nyilas et al, assigned U.S. Ser. No. 091,224 and filed Aug. 31, 1987, now U.S. Pat. No. 4,848,774 which issued July 18, 1989.

7. "Reactor Coolant Pump Shaft Seal Utilizing Shape Memory Metal" by D. J. Janocko, assigned U.S. Ser. No. 197,174 and filed May 23, 1988.

8. "Reactor Coolant Pump Auxiliary Seal For Reactor Coolant System Vacuum Degasification" by J. D. Fornoff, assigned U.S. Ser. No. 222,649 and filed July 21, 1988.

9. "Reactor Coolant Pump Having Double Dam Seal With Self-Contained Injection Pump Mechanism" by D. J. Janocko, assigned U.S. Ser. No. 231,039 and filed Aug. 12, 1988.

10. "Reactor Coolant Pump Auxiliary Flexible Vacuum Seal For Reactor Coolant System Vacuum Degasification" by C. D. Bice et al, assigned U.S. Ser. No. 294,331 and filed Jan. 6, 1989.

11. "Reactor Coolant Pump Having Thermally Stabilized Hydrostatic Sealing Assembly" by C. D. Bice, assigned U.S. Ser. No. 466,143 and filed Jan. 16, 1990.

BACKGROUND OF THE INVENTION

1. Field of the Invention

The present invention relates generally to shaft seals and, more particularly, is concerned with an improved dynamic secondary seal assembly for a reactor coolant pump used in a nuclear power plant.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft.

The middle shaft seal section includes three tandemly-arranged mechanical seal stages—or lower, middle and upper sealing assemblies. The sealing assemblies are located in a seal housing concentric to, and near the top end of, the pump shaft. Their combined purpose is to mechanically maintain a high positive pressure (2500 psi) boundary between the seal housing interior and the outside thereof during normal pump operating conditions while ensuring that the pump shaft can rotate freely within the seal housing. The lower sealing assembly which performs most of the pressure sealing (approximately 2250 psi) is of the non-contacting hydrostatic type, whereas the middle and upper sealing assemblies are of the contacting or rubbing mechanical type. Representative examples of pump shaft sealing assemblies known in the prior art are the ones disclosed in MacCrum U.S. Pat. No. 3,522,948, Singleton U.S. Pat. No. 3,529,838, Villasor U.S. Pat. No. 3,632,117, Andrews et al U.S. Pat. No. 3,720,222 and Boes U.S. Pat. No. 4,275,891 and in the first three patent applications cross-referenced above, all of which are assigned to the same assignee as the present invention.

The reactor coolant pump thus includes three mechanical seal stages that comprise a controlled leakage seal system. The reactor coolant pump also includes a plurality of secondary seals. Three of these secondary seals, located one per mechanical seal stage, are dynamic seals. The dynamic nature of these secondary seals is due to the fact that they are interposed between respective parts of the mechanical seal stages which undergo axial movement relative to one another. As they perform their sealing functions, the dynamic secondary seals must also accommodate several oscillatory movements induced in them by the mechanical motion and thermal expansion of the rotating pump shaft.

Although the three mechanical seal stages operate at quite different pressure conditions, the preference traditionally has been to provide the three dynamic secondary seals located at the three mechanical seal stages with substantially the same seal design. Originally, each secondary seal was a bare annular O-ring utilized between the relative axially moving parts of the respective mechanical seal stage. However, this first seal design did not function properly at all three mechanical seal stages due to its inability to accommodate the various dynamic conditions induced by the different pressures at the different seal stages. Subsequently, a second seal design was employed, being comprised of an outer annular O-ring and an inner annular liner composed of Teflon material and having a L-shaped cross-section. The liner provided a seat for the O-ring and slidably engaged the relative movable part of the respective mechanical seal stage. This second seal design was found to have improved performance but encountered difficulties in assembly. A third seal design, which has been used up to the present, was then substituted. This third seal design employed an outer annular O-ring also. But instead of the annular liner having the L-shaped cross-section of the second seal design, the third seal design used an annular Teflon liner having a double delta cross-sectional shape. Although the third seal design overcame the assembly problems of the second seal design, it still presented a sliding interface like the second design which tended to degrade and leak and to permit migration of dirt and foreign matter into the interfaces of the secondary seal.

Consequently, a need exists for an alternative construction of the dynamic secondary seals for the lower, middle and upper mechanical seal stages which will avoid the above-mentioned problems without introduction of a new set of problems in their place.

SUMMARY OF THE INVENTION

The present invention provides an improved dynamic secondary seal assembly designed to satisfy the aforementioned needs. The dynamic secondary seal assembly utilizes the combination of the annular liner with a modified L-shaped cross-section and the annular O-ring in a modified arrangement with respect to the axially movable parts of the respective mechanical seal stage. In the arrangement of the present invention, the improved dynamic secondary seal achieves zero by-pass leakage, produces consistent friction during the life of the associated mechanical seal stage, and eliminates the need for hard coating of the one part of the mechanical seal stage which moves relative to the secondary seal. The improved dynamic secondary seal having the modified arrangement of the present invention performs satisfactorily at all three mechanical seal stages.

Accordingly, the present invention is set forth in a pump and directed to a seal assembly in combination with first and second annular seal parts of the pump. The first and second annular seal parts are radially spaced from one another by a clearance gap and capable of translatory movement relative to one another. One of the seal parts has a cylindrical surface and the other of the seal parts has an annular groove which opens into the gap and includes an inner cylindrical surface facing toward the cylindrical surface of the other seal part. The seal assembly comprises: (a) an annular liner disposed within the groove in the one seal part and projecting therefrom toward the surface of the other seal part, with the liner defining a first surface oriented generally transversely to the cylindrical surface of the other seal part and a second surface oriented generally parallel to the cylindrical surface of the other seal part; and (b) a flexibly resilient annular seal member disposed within the groove between the cylindrical surface of the other seal part and the second surface of the liner, with the seal member being seatable on the first surface of the annular liner and projecting from the groove farther than the liner and into contact with the cylindrical surface of the other seal part such that the annular seal member is capable of rolling on the cylindrical surface of the other seal part and slipping on the first surface of the annular liner upon translatory movement of the seal parts relative to one another.

More particularly, the liner is composed of a material having a lower coefficient of friction than a material composing the other seal part. Further, the liner includes a first radial portion extending generally radial with respect to the cylindrical surface of other seal part and defining the first surface of the liner, and a second axial portion extending generally parallel with respect to the cylindrical surface of the other seal part and defining the second surface of the liner. The first and second portions of the liner are rigidly connected together The annular seal member is an O-ring composed of elastomer material.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
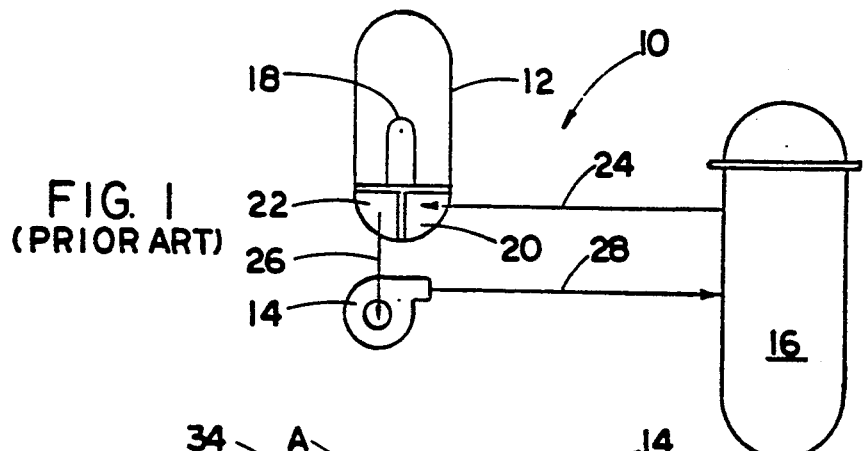
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 2:
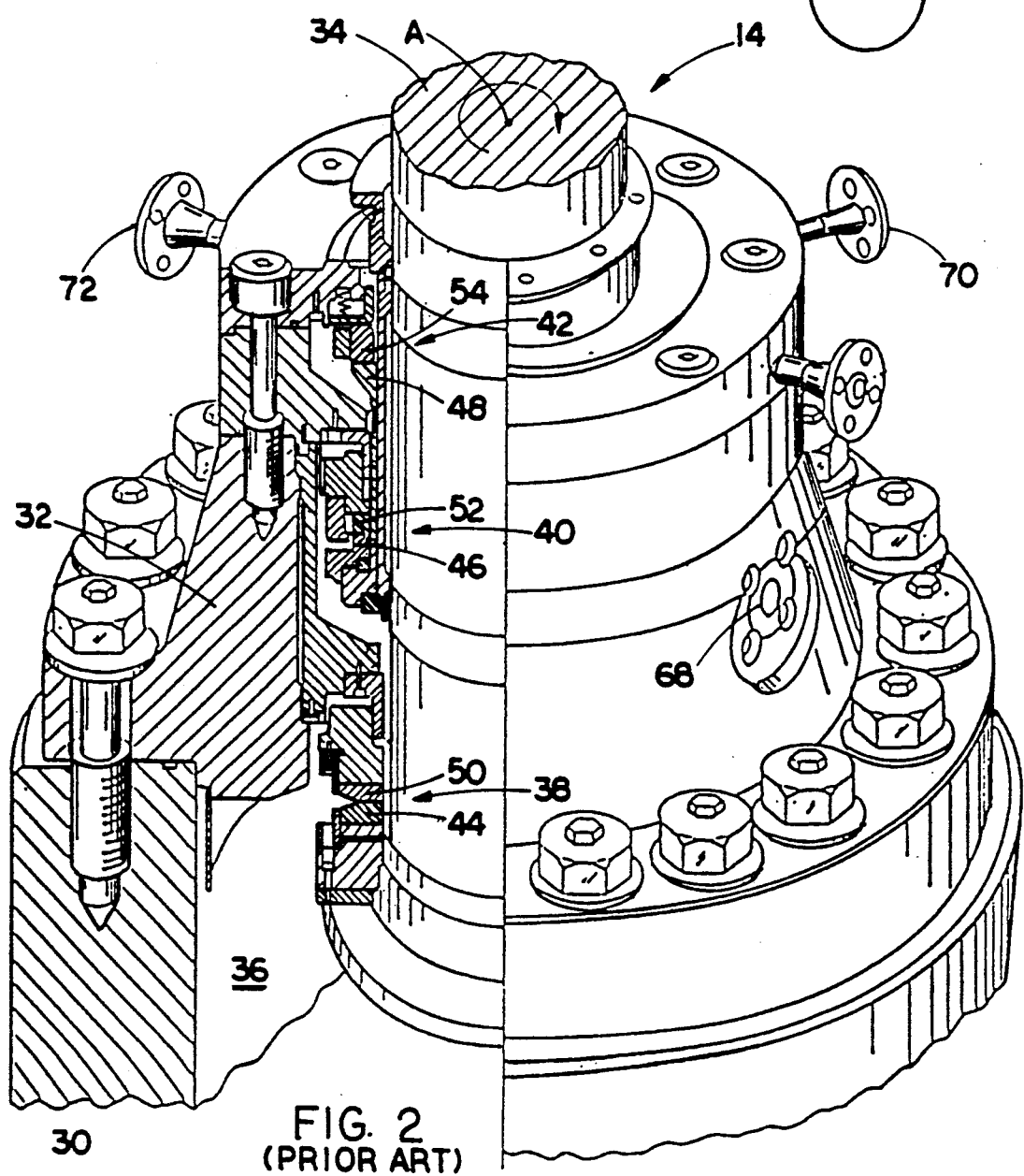
FIG. 2 is a cutaway perspective view of the shaft seal section of a conventional reactor coolant pump, illustrating in cross-section the seal housing and the lower, middle, and upper sealing assemblies which are disposed within the seal housing and surround the pump shaft in this section of the pump
Figure 3:
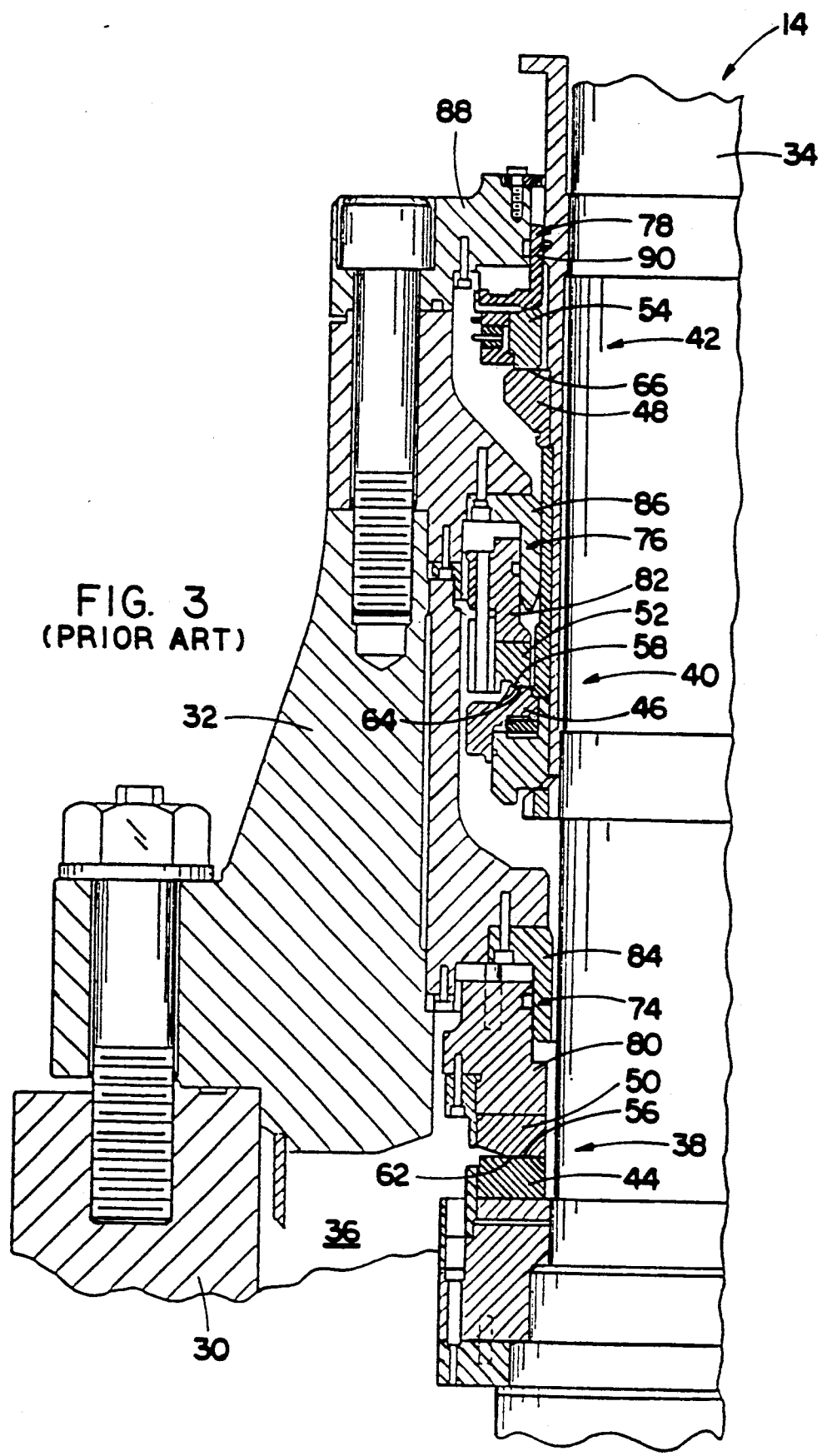
FIG. 3 is an enlarged axial sectional view of the seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged mechanical seal stages—lower, middle, and upper sealing assemblies 38,40,42—are provided in the positions illustrated in FIGS. 2 and 3 about the pump shaft 34 and within the pump housing 30. The lower sealing assembly 38 which performs most of the pressure sealing (approximately 2250 psi) is of the non-contacting hydrostatic type, whereas the middle and upper sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is coupled to the sealing housing 32 so as to prevent rotational movement but permit translatory movement of the respective seal rings 50,52,54 along the pump shaft 34 toward and away from the respective runners 44,46,48 rotating with the pump shaft. The respective runners 44,46,48 and seal rings 50,52,54 have top and bottom annular surfaces 56,58,60 and 62,64,66 which face one another. The annular facing surfaces 56,62 of the runner 44 and seal ring 50 of the lower sealing assembly 38 normally do not contact one another but instead a film of fluid normally flows between them. In particular, a pressurized fluid within the pump housing 30 creates a flowing film of fluid which prevents annular facing surfaces 56,62 from coming into contact with one another. On the other hand, the annular facing surfaces 58,64 and 60,66 of the runners and seal rings 46,52 and 48,54 of the middle and upper sealing assemblies 40 and 42 normally contact or rub against one another.

Because the lower sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes lower, middle and upper seal leakoff ports 68,70,72 for accommodating coolant fluid leakoff from the lower, middle and upper sealing assemblies 38,40,42.

The lower sealing assembly 38 (or No. 1 seal), the main seal of the pump, causes a pressure drop of coolant fluid from about 2250 psi to 30 psi across its facing surfaces 56,62 and allows a flow rate of about 2-3 gpm therethrough. The low-pressure coolant fluid leaking through the lower sealing assembly 38 flows up the shaft annulus to the region of the middle sealing assembly 40. At the middle sealing assembly 40 (or No. 2 seal), most of the coolant fluid from the lower sealing assembly 38 is diverted to the lower seal leakoff port 68. However, a portion of the fluid passes through the middle sealing assembly 40, leaking at a flow rate of about 2 gph at a pressure drop of from 30 psi to 3-7 psi. The still lower pressure coolant fluid leaking through the middle sealing assembly 40 flows further up the shaft annulus to the region of the upper sealing assembly 42. At the upper sealing assembly 42 (or No. 3 seal), most of the flow leaking from the middle sealing assembly 40 is diverted by the upper sealing assembly 42 out through the middle seal leakoff port 70.

Prior Art Dynamic Secondary Seals

Associated with the tandemly-arranged lower, middle and upper sealing assemblies 38,40,42 of the three mechanical seal stages, the reactor coolant pump 14 further includes respective lower, middle and upper dynamic secondary seals 74,76,78. The dynamic secondary seals 74,76,78 are interposed between respective parts associated with the lower, middle and upper sealing assemblies 38,40,42 of the mechanical seal stages which undergo axial movement relative to one another. The respective relatively movable parts associated with the lower and middle sealing assemblies 38,40 are annular lower and middle support members 80,82 of the respective lower and middle seal ring 50,52 and annular lower and middle cylindrical inserts 84,86 attached to the seal housing 32. The respective relative movable parts associated with the upper sealing assembly 42 are an annular upper cap 88 of the seal housing 32 and an annular upper cylindrical insert 90 attached to the upper seal ring 54.

Figure 4:
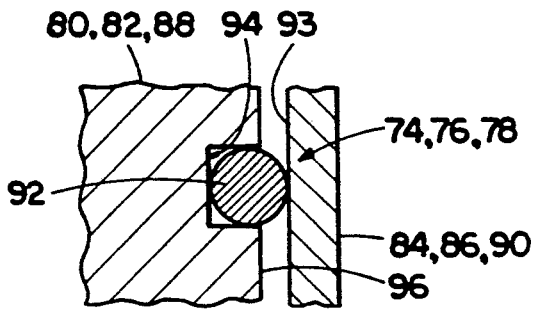
FIG. 4 is an enlarged fragmentary axial sectional view of one prior art dynamic secondary seal in the form of an annular O-ring which has been used heretofore in the mechanical seal stages of the pump of FIG. 3.

The dynamic nature of the secondary seals 74,76,78 relates to two components of secondary seal movement induced by shaft movement. One component is a low amplitude, high frequency oscillation and the other component is a moderate amplitude, very low frequency movement. The low amplitude, high frequency oscillatory component of secondary seal movement is induced by axial shaft movement and axial runout occurring one per each revolution of the shaft 34. The moderate amplitude, very low frequency component of secondary seal movement is induced by thermal axial growth of the shaft 34 which is related to changes in injection temperature, cycling of containment fans, etc Although the upper, middle and lower sealing assemblies 38,40,42 of the three mechanical seal stages operate under different pressure conditions, the various prior art designs of the three dynamic secondary seals 74,76,78 provided heretofore at any given time at the three mechanical seal stages have been substantially the same. As shown in FIG. 4, the original prior art design of each of the dynamic secondary seals 74,76,78 was merely an annular O-ring 92 (being made of 80 durometer) frictionally engaged with an outer cylindrical surface 93 of the respective one of the inserts 84,86, 90 and seated within and projecting inwardly from an annular gland or groove 94 formed in the interior surface 96 of the respective one of the support members 80,82 and cap 88 at the respective locations of the lower, middle and upper seal assemblies 38,40,42.

However, this prior art design did not function properly at all three mechanical seal stages for two reasons. The first reason was that the secondary seal 76 at the lower sealing assembly 38 (or No. 1 seal) of the first mechanical seal stage operated at 2000 psi. At this pressure, the O-ring 92 was fully conformed into the gland or groove 94 such that no elastic deformation could accommodate the high frequency oscillation and resulted in high frictional loads and scuffing at the interface between the O-ring 92 and the insert 84. The durability of this secondary seal was unsatisfactory. The O-ring 92 by itself did serve satisfactorily at middle sealing assembly 40 (or No. 2 seal) of the second mechanical seal stage which operated at an intermediate pressure of about 50 psi. The second reason was the unsatisfactory performance of the O-ring 92 at the upper sealing assembly 42 (or No. 3 seal) of the third mechanical seal stage. Here the low pressure drop of about 3 psi resulted in seating force stiffnesses which were too small to overcome the frictional drag of the O-ring 92 during the low frequency, moderate amplitude movements.

Figure 5:
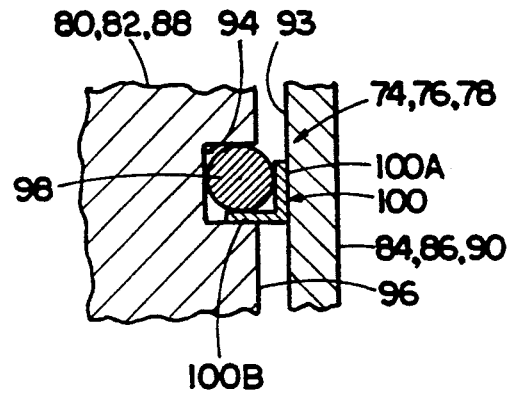
FIG. 5 is an enlarged fragmentary axial sectional view of another prior art dynamic secondary seal in the form of an annular O-ring seated by an annular liner having a L-shaped cross-section which has been used heretofore in the mechanical seal stages of the pump of FIG. 3.

Thereafter, as shown in FIG. 5, the next prior art design of each of the dynamic secondary seals 74,76,78 was an assembly of an outer annular O-ring 98 (also being made of 80 durometer) and an inner annular liner 100 seated within and projecting from the annular groove 94. The inner annular liner 100 is composed of a low friction plastic material, such as commercially available under the trademark Teflon, and is L-shaped in cross-section. The annular liner 100 has axially-extending and radially-extending portions 100A,100B rigidly connected together at a substantially right angle and seating the annular O-ring 98. The annular O-ring 98 is seated within the groove 94 and the radial liner portion 100B extends into the groove 94. The axial liner portion 100A frictionally and slidably engages the outer cylindrical surface 93 of the respective one of the inserts 84,86,90. The O-ring 98 provides the spring force to keep the liner 100 against the insert. This design presented assembly problems although the liner was found to serve satisfactorily as an anti-extrusion ring at the location of the lower sealing assembly 38 and at the location of the middle sealing assembly 40 during high pressure operation. This design was eventually found not to function well enough at all three mechanical seal stages. Particularly, by-pass leakage occurred in view that the high modulus of the liner 100 prevented it from conforming to the worn surface of the respective insert 84,86,90. By-pass leakage and dithering movement of the liner and insert relative to one another drew dirt into the interfaces between the liner and insert where the dirt then became trapped and accelerated abrasive degradation.

Figure 6:
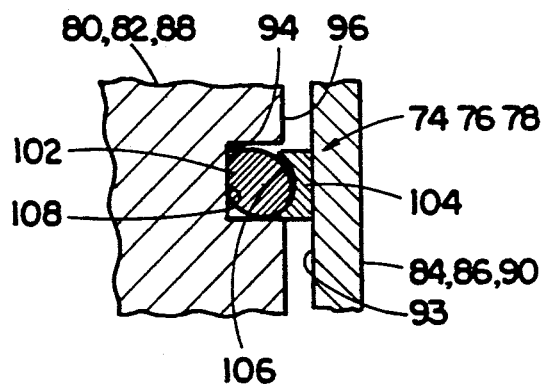
FIG. 6 is an enlarged fragmentary axial sectional view of still another prior art dynamic secondary seal in the form of an annular O-ring seated by an annular double delta liner which has been used heretofore in the mechanical seal stages of the pump of FIG. 3.

Finally, as shown in FIG. 6, the final prior art design of each of the dynamic secondary seals 74,76,78 employed was an assembly of an outer annular O-ring 102 and an inner annular channel liner 104 having a double delta-shape in cross-section and also preferably made of low-friction Teflon material. Although the latter double delta design overcame the assembly problem experienced with the earlier L-shaped design, it still presented a sliding interface which tended to degrade and leak and permit migration of dirt and foreign matter into the interfaces of the secondary seal and insert. Also, the use of the double delta channel liner 104 inadvertently introduced increased loading. The compression of the O-ring 96 between the arcuate outer surface 106 of the liner 104 and the planar inner surface 108 of the groove 94 resulted in significantly higher loadings than existed for the compression between the axial portion 100A of the L-shaped liner 100 and the planar inner surface 108 of the groove 94. This lead to introduction of a softer O-ring in the secondary seals 76,78 at the locations of the middle and upper sealing assemblies 40,42.

Improved Dynamic Secondary Seals

Turning now to FIGS. 7-10, there is shown the improved design for the dynamic secondary seals 74,76,78 in accordance with the present invention which avoids the problems arising from the present prior art design of the dynamic secondary seals 74,76,78 of FIGS. 4-6 described above. The improved design of the dynamic secondary seals 74,76,78 of the present invention is applicable for use at the locations of the lower, middle and upper sealing assemblies 38,40,42 of the three mechanical seal stages.

Figure 7:
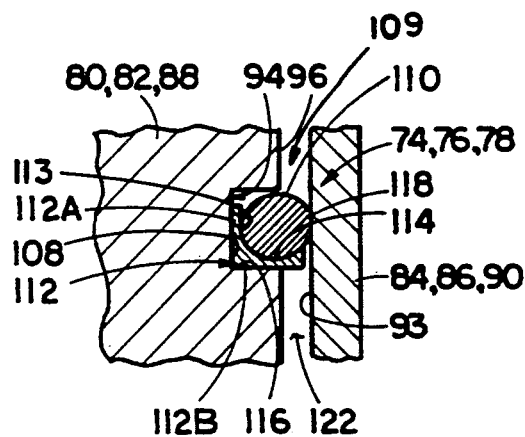
FIG. 7 is an enlarged fragmentary axial sectional view of the improved dynamic secondary seal of the present invention.

As seen in FIG. 7, the improved design of the dynamic secondary seals 74,76,78 is an assembly 109 of an inner annular-shaped flexibly yieldable resilient member in the form of an O-ring 110 and an outer annular liner 112 disposed within and projecting from the annular groove 94. The outer annular liner 112 is preferably composed of the low friction Teflon plastic material and is generally L-shaped in cross-section. The annular liner 112 has axially-extending and radially-extending portions 112A,112B rigidly connected together at a substantially right angle. The axial portion 112A defines an interior cylindrical surface 113 oriented generally parallel to the outer cylindrical insert surface 93, whereas the radial portion 112B defines an internal arcuate surface 114 oriented generally transversely to the outer cylindrical insert surface 93 and having a cradle-like configuration against which the annular O-ring 110 can be seated. The annular liner 112 is disposed within the groove 94 and engaged with the inner circumferential surface 108 of the groove 94 at its axial portion 112A. The annular liner 112 extends radially along a lower radial planar surface 116 of the groove 94 and therefrom at its radial portion 112B. The annular O-ring 110 at its inner side 118 engages the outer cylindrical surface 93 of the respective one of the inserts 84,86,90.

Figure 8:
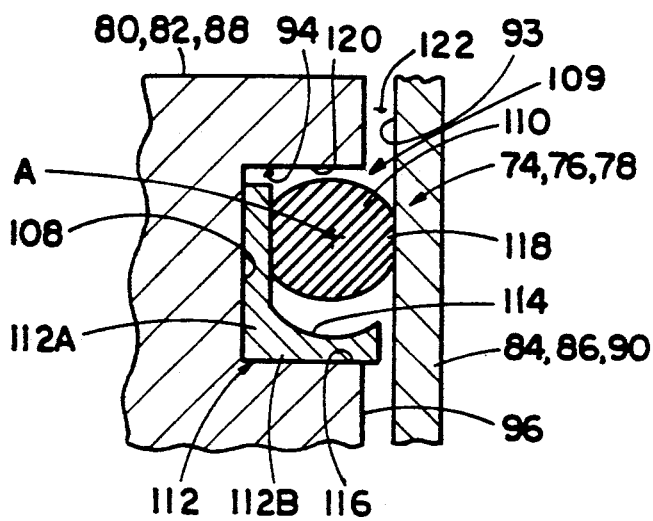
FIGS. 8–10 are enlarged fragmentary axial sectional views of the improved dynamic secondary seal of the present invention, illustrating respectively the seal as assembled, during low pressure operation such as at the Nos. 2 and 3 seals, and during high pressure operation such as at the No. 1 seal.

FIG. 8 shows the "as assembled" position of the secondary seal assembly 109 at the locations of each of the lower, middle and upper sealing assemblies 38,40,42 (Nos. 1-3 seals) of the three mechanical seal stages. In the "as assembled" position, the O-ring 110 is located adjacent to an upper radial planar surface 120 of the groove 94 and spaced from the interior arcuate surface 114 of the liner 112 on the radial portion 112B thereof. The liner 112 rests on the lower radial surface 116 of the groove 94.

Figure 9:
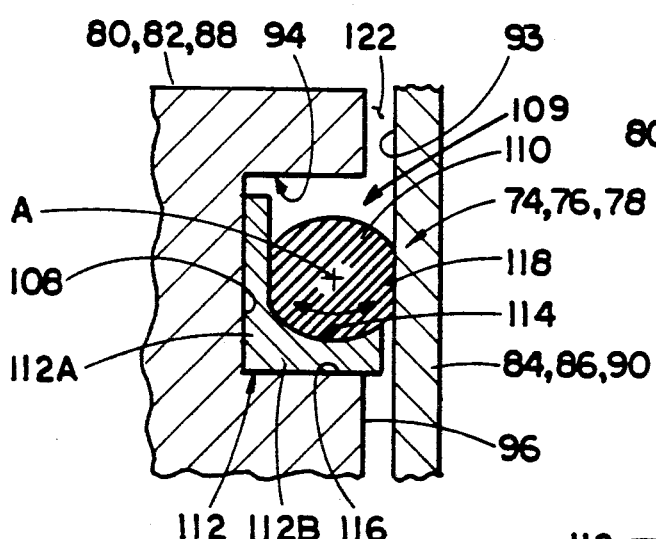

FIG. 9 shows the "low pressure operation" position of the secondary seal assembly 109 at the locations of each of the middle and upper sealing assemblies 40,42 (Nos. 2 and 3 seals) and at the location of the lower sealing assembly 38 when at a pressure of less than 1000 psi. Downward pressure on the O-ring 110 causes it to roll downward on the insert 84,86,90 from the "as assembled" position of FIG. 8 to the "low pressure operation" position of FIG. 9. In the "low pressure operation" position of FIG. 9, the O-ring 110 is seated on the interior arcuate or cradle-like surface 114 of the liner 112. In such position, as the insert 84,86,90 undergoes a dithering-type axial movement relative to the O-ring 110, the O-ring 110 rotates about its own axis A, rolls on the outer surface 93 of the insert 84,86,90 and slips relative to the surface 114 of the liner 112 since frictional forces at the interface of the O-ring 110 with the insert 84,86,90 are much greater than at the interface of the O-ring 110 with the surface 114 of the liner 112.

Figure 10:
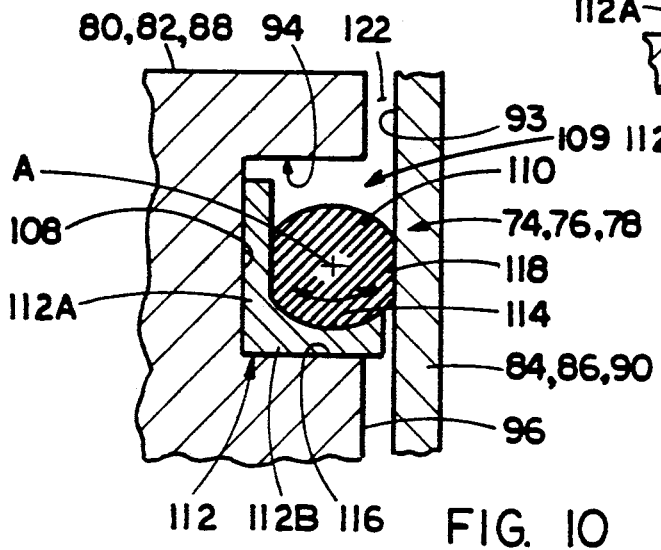

FIG. 10 shows the "high pressure operation" position of the secondary seal assembly 109 at the locations of each of the lower and middle sealing assemblies 38,40 (Nos. 1 and 2 seals) when at a pressure of greater than 1000 psi. Greater downward compressive pressure on the O-ring 110 attempts to extrude the O-ring 110 into a clearance gap 122 between the insert 84,86,90 and the parts 80,82,88. However, the same compressive forces cause the radial portion 112B to lengthen and further bridge the gap 122 preventing extrusion of the O-ring 110 past it and through the gap. Again, the O-ring 110 can rotate about its own axis A and roll on the outer surface 93 of the insert 84,86,90 and slip relative to the surface 114 of the liner 112 as the insert undergoes a dithering-type axial movement relative to the O-ring 110.

Figure 11:
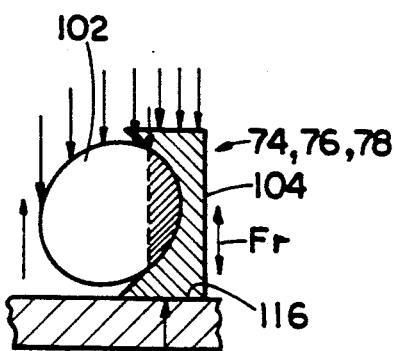
FIG. 11 is a diagrammatic view of the prior art dynamic secondary seal of FIG. 6, illustrating shearing deformation of an O-ring in the arrangement of the prior art seal.
Figure 12:
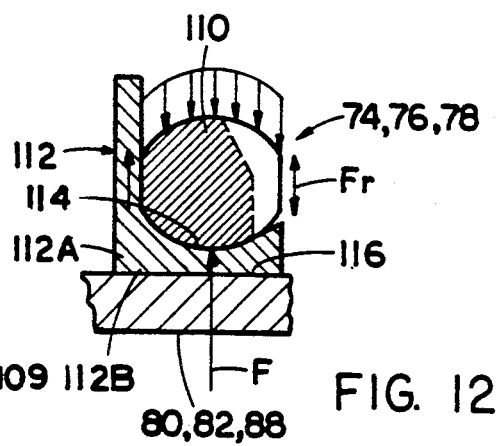
FIG. 12 is a diagrammatic view of the improved dynamic secondary seal of FIG. 7, illustrating shearing deformation of an O-ring in the arrangement of the improved seal.

FIG. 11 illustrates that in the present prior art design the contact force F must be transferred to the frictional force Fr between the insert (not shown) and the liner 104 before O-ring compliance can accommodate the small amplitude cyclic (dithering) displacement. Thus, a significant frictional load must be supplied by the insert before the channel liner 104 is pulled away from the groove wall and shearing deformation of the O-ring 102 can commence. In contrast thereto, FIG. 12 illustrates that the O-ring 110 of the improved assembly 109 is positioned such that the small amplitude, high frequency motions (or ditherings) can be accommodated by cyclic shearing deformation of the elastomeric O-ring 110 rather than Coulomb frictional shearing Fr at the interface of the O-ring and the insert.

In summary, the improved design of the dynamic secondary seal provides the following additional features and advantages: (1) the assembly is retrofittable; (2) moderate amplitude, low frequency movement is accommodated by the O-ring slipping relative to the liner and rolling along the insert surface, with the rolling motion eliminating insert surface degradation such that, at least for the No. 2 and 3 seals, a hard face insert coating is not needed; (3) the slipping which does occur takes place between two compliant members (the Teflon liner and elastomer O-ring) which are relatively insusceptible to abrasive degradation; (4) the shape of the cradle-like liner surface limits high pressure conformance deformation of the O-ring and thereby reduces the deformation recovery time required by the O-ring when the pressure goes from high (2200 psi) to low (400 psi) values; (5) the O-ring is compressed between flat and generally parallel surfaces of the groove and insert which is more efficient from a sealing standpoint because contact stresses sufficient to prevent leakage are achieved at both surfaces with a minimum of total contact force; (6) because the elastomer O-ring is the active sealing member with the insert surface, zero leakage is assured for the complete life of the respective mechanical seal, and even if some degradation of the insert surface has occurred, the relatively low modulus elastomer O-ring can conform to the degraded surface and preclude leakage; (7) zero leakage has the additional benefit of discouraging the migration of dirt into the interface of the secondary seal; (8) high temperature O-rings can be employed in the dynamic secondary seals at both the No. 1 and 2 seals with no degradation of conventional performance.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a pump having a stationary housing with pressurized fluid therein and a shaft with a rotational axis, a sealing arrangement disposed in said housing and sealably mounting said shaft relative to said housing, said sealing arrangement comprising:

(a) a pair of annular seal parts radially spaced from one another by a clearance gap and capable of translatory movement relative to one another, one of said seal parts having a cylindrical surface and the other of said seal parts having an annular groove which opens toward said gap and includes an inner cylindrical surface facing toward said cylindrical surface of said one seal part; and (b) a sealing assembly including (i) an annular liner disposed within said groove in said other seal part and projecting therefrom toward said surface of said one seal part, said liner defining a first surface oriented generally transversely to said cylindrical surface of said one seal part and a second surface oriented generally parallel to said cylindrical surface of said one seal part, said first surface having an arcuate shape providing a cradle-like configuration, and (ii) a flexibly resilient annular seal member disposed within said groove between said cylindrical surface of said one seal part and said second surface of said liner, said seal member being seatable against said arcuate-shaped first surface of said annular liner having said cradle-like configuration and projecting from said groove and across said gap farther than said liner and into contact with said cylindrical surface of said one seal part such that said annular seal member is capable of rolling on said cylindrical surface of said one seal part and slipping on said first surface of said annular liner upon translatory movement of said seal parts relative to one another.

2. The assembly as recited in claim 1, wherein said liner is composed of a material having a lower coefficient of friction than a material composing said one seal part.

3. The assembly as recited in claim 1, wherein said liner includes a first radial portion extending generally radial with respect to said cylindrical surface of said one seal part and a second axial portion extending generally parallel to said cylindrical surface of said one seal part.

4. The assembly as recited in claim 3, wherein said first radial portion of said liner defines said first surface thereof and said second axial portion of said liner defines said second surface thereof.

5. The assembly as recited in claim 4, wherein said first and second portions of said liner are rigidly connected together.

6. The assembly as recited in claim 1, wherein said annular seal member is an O-ring composed of elastomer material.

7. In combination with a pair of annular seal parts radially spaced from one another by a clearance gap and capable of translatory movement relative to one another, one of said seal parts having a cylindrical surface and the other of said seal parts having an annular groove which opens into said gap and includes an inner cylindrical surface facing toward said cylindrical surface of said one seal part, a seal assembly comprising:

(a) an annular liner disposed within said groove in said other seal part and projecting therefrom toward said surface of said one seal part, said liner defining a first surface oriented generally transversely to said cylindrical surface of said one seal part and a second surface oriented generally parallel to said cylindrical surface of said one seal part, said first surface having an arcuate shape providing a cradle-like configuration; and (b) a flexibly resilient annular seal member disposed within said groove between said cylindrical surface of said one seal part and said second surface of said liner, said seal member being seatable against said arcuate-shaped first surface of said annular liner having said cradle-like configuration and projecting from said groove farther than said liner and across said gap into contact with said cylindrical surface of said one seal part such that said annular seal member is capable of rolling on said cylindrical surface of said one seal part and slipping on said arcuate-shaped first surface of said annular liner upon translatory movement of said seal parts relative to one another.

8. The assembly as recited in claim 7, wherein said liner is composed of a material having a lower coefficient of friction than a material composing said one seal part.

9. The assembly as recited in claim 7, wherein said liner includes a first radial portion extending generally radial with respect to said cylindrical surface of said one seal part and a second axial portion extending generally parallel to said cylindrical surface of said one seal part.

10. The assembly as recited in claim 9, wherein said first radial portion of said liner defines said first surface thereof and said second axial portion of said liner defines said second surface thereof.

11. The assembly as recited in claim 10, wherein said first and second portions of said liner are rigidly connected together.

12. The assembly as recited in claim 7, wherein said annular seal member is an O-ring composed of elastomer material.

* * * * *